July 30, 1963 J. J. KOURI 3,099,560
SELF-SEALING ROLL FILM
Filed April 2, 1962 2 Sheets-Sheet 1
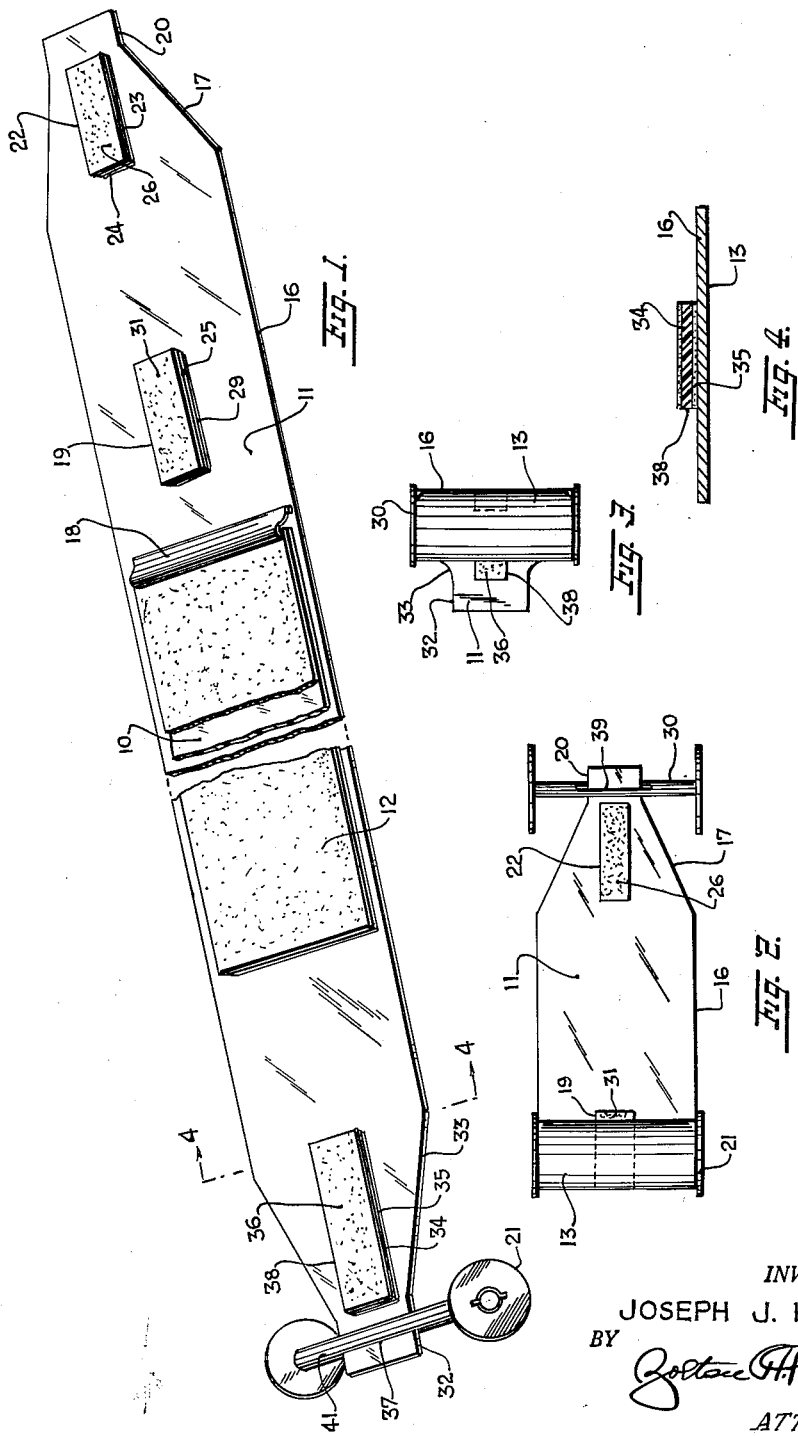
INVENTOR.
JOSEPH J. KOURI
BY
ATTORNEY

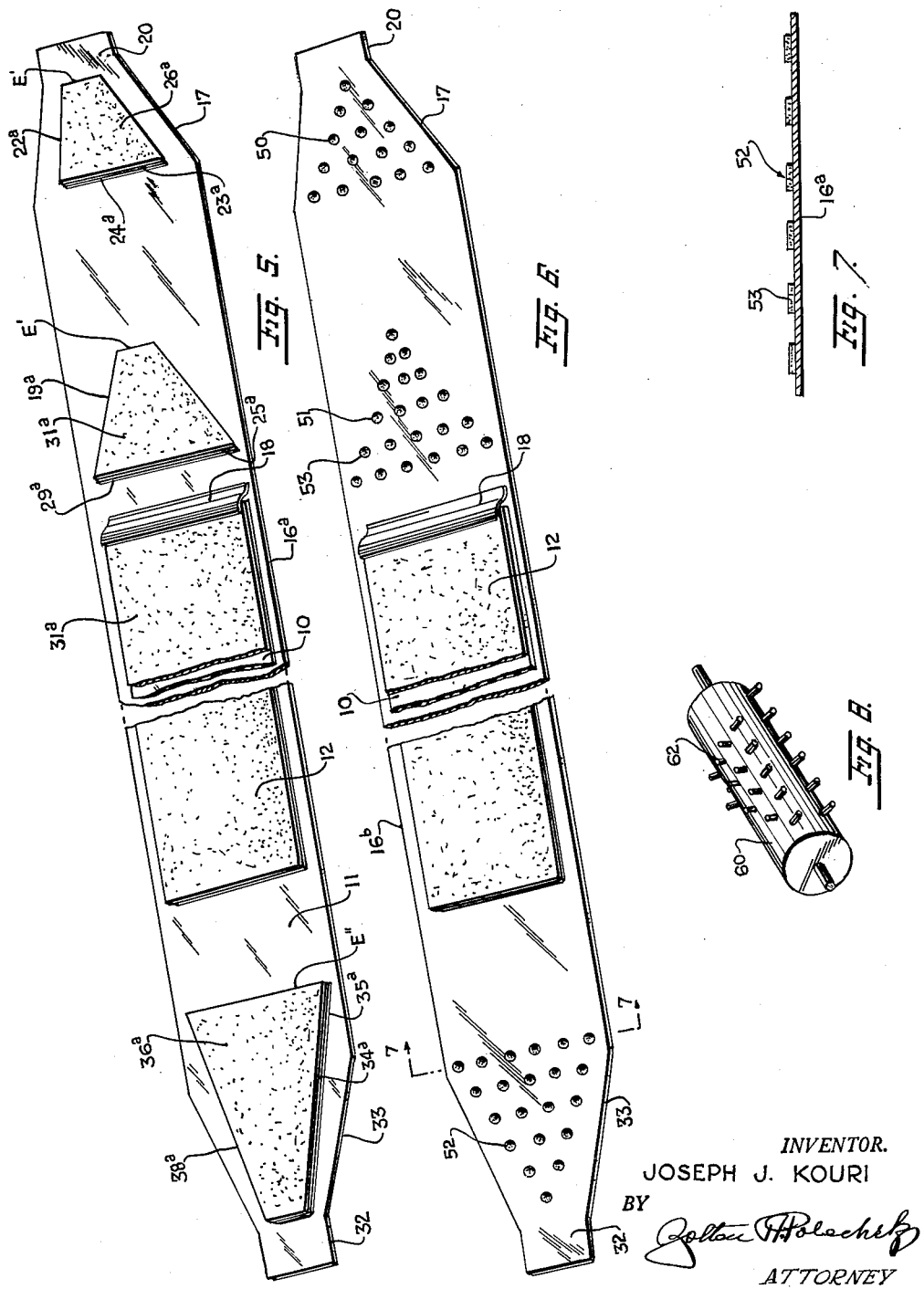

United States Patent Office 3,099,560
Patented July 30, 1963

3,099,560
SELF-SEALING ROLL FILM
Joseph J. Kouri, 314 Highland Ave., Peekskill, N.Y.
Filed Apr. 2, 1962, Ser. No. 184,418
1 Claim. (Cl. 96—78)

This invention concerns an improved rolled photographic film package.

In photographic film, as heretofore conventionally packaged, the roll of unexposed film is provided with a paper seal at the outer end of the paper backing wrapper. The user must first break this seal to attach the end of the paper wrapper to a winding or takeup spool in the camera. There is always the danger that the user may lose his grasp on the roll so that it accidentally unwinds to expose and fog the film. After the roll end has been inserted and engaged on the takeup spool and inserted in the camera, and the film has been exposed in the camera, the user must now remove the exposed roll of film from the camera. The exposed film is now on the takeup spool. In conventional film packages, there is a gummed paper tape on the exposed end of the paper backing. This must be moistened and applied to the backing to seal the roll. If the user handles this exposed roll inexpertly, the rolled film will loosen on the spool to admit light and fog the film. If the roll is accidentally dropped after the leading seal is broken or before the end seal is applied, the roll will partially or wholly unwind to expose the film to light and destroy the photosensitive emulsion.

The present invention is directed at overcoming the difficulties and objections of prior forms of roll film packaging and sealing. According to the invention there are provided three pressure sensitive adhesive seals. Two of the seals are located at the leading end of the paper backing and the third seal is located at the trailing end. The first seal is broken when the film is threaded on the takeup spool. The second seal remains intact until the film is mounted in the camera and unwound to set the film for picture taking. The third seal is applied after the film is completely exposed so that the user removes a completely sealed roll of exposed film from the camera. Thus, at no time is it possible for the roll to unwind inadvertently, and the final sealing operations heretofore required are no longer necessary.

It is therefore a principal object of the invention to provide a film on a paper backing with a pair of adhesive, pressure sensitive seals at the leading end of the wrapper of the unexposed film and with another adhesive, pressure sensitive seal at the trailing end of the wrapper.

Another object is to provide a plurality of seals on a wrapper for photographic film, the seals being formed as paper or plastic strips coated with adhesive on opposite sides.

A further object is to provide a plurality of seals on a wrapper for photographic film, the seals being formed of pressure sensitive adhesive material per se.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of a film package embodying the invention, the package being shown in unrolled condition, parts being broken away.

FIG. 2 is a top plan view of the film partially unrolled and engaged on a takeup spool, on a reduced scale.

FIG. 3 is a top plan view of the film package almost completely rolled up on the takeup spool.

FIG. 4 is a sectional view on an enlarged scale taken on line 4—4 of FIG. 1.

FIGS. 5 and 6 are perspective views of two other film packages in unrolled condition, parts being shown broken away.

FIG. 7 is a sectional view on an enlarged scale taken on line 7—7 of FIG. 6.

FIG. 8 is a perspective view of a roller employed to apply adhesive seals to a film wrapper.

In FIGS. 1–4 is shown a rectangular strip of plastic film 10 having a photosensitive emulsion coating 12 on its upper side. The film is secured at one end to the upper side 11 of a longer and wider paper backing strip or wrapper 16 by a tape 18. The backing strip has a narrow leading end 20 and a tapered section 17 between the leading end and the full width of the strip. Located on the upper side of the strip 16 and centered in the tapered section is a first sealing member 22. This member is formed of a narrow tab 23 of paper or plastic film undercoated with an adhesive 24 and overcoated with another adhesive 26. The adhesive 24 permanently secures the tab 23 to the backing 16. The adhesive 26 is pressure sensitive so that as the leading end of the backing strip is unrolled to engage the end 20 of the wrapper 16 on the takeup spool 30, the seal provided by the adhesive 26 will be broken while the adhesion of the tab 23 to the strip 16 will be maintained by adhesive 24.

In FIG. 1 the film package is shown wholly unrolled. Prior to exposure it will be rolled up on supply spool 21 as shown in FIG. 2. A second seal 19 including a tab 25 is provided on the wrapper 16 located between the end 20 of the wrapper and the tape 18 at the leading end of the film. This tab is undercoated with a permanent adhesive 29 and overcoated with a pressure sensitive adhesive 31. Thus, as the wrapper is threaded on the spool 30, the adhesive 31 engages the rear side 13 of the wrapper and holds the roll tight, as indicated in FIG. 2.

At its trailing end, the wrapper is formed with a narrow section 32 and a tapered section 33. A third seal 38 including a tab 34 is centrally located on the tapered section 33. This tab is undercoated with a permanent adhesive 35 and overcoated with a pressure sensitive adhesive 36.

FIG. 3 shows the adhesive 36 sealing the trailing end of the wrapper to the last turn of the wrapper around takeup spool 30. The narrow section 32 of the wrapper is engaged in slot 37 formed in the spool shaft 41 of the supply spool 21 as shown in FIG. 1. In FIG. 2 the leading end 20 of the wrapper is shown engaged in the slot 39 of takeup spool 30 while the remainder of the film and wrapper is engaged on the supply spool 21.

In FIG. 5, the tabs 23ª, 25ª and 34ª of seals 22ª, 19ª, 38ª are trapezoidal in form. Tabs 23ª and 25ª have their narrow ends E, E' facing the leading end 20 of the wrapper 16ª. Seal 38ª has its wider end E" facing the trailing end of the wrapper. The tabs are undercoated with permanent adhesive layers 24ª, 29ª, 35ª and overcoated with pressure sensitive adhesive layers 26ª, 31ª, 36ª. This arrangement of the sealing tabs is desirable since the force required to loosen or break the seals increases in the direction of unwinding of the roll.

In FIGS. 6 and 7, the seals 50, 51 and 52 on wrapper 16ᵇ are formed by triangular arrays of spots 53 of a pressure sensitive adhesive substance. The spots of adhesive can be deposited by a roller 60 as shown in FIG. 8. The roller has spaced fingers 62 to which the adhesive is fed for application to the wrapper 16ᵇ to form the triangular arrays shown in the drawing.

The triangular arrangement of sealing spots is desirable because loosening of any one spot will not affect adherence of the others. The force required to loosen the seals must increase in the direction of unrolling the film package since narrow ends of seals 50, 51 face the leading end of the wrapper 16ᵇ while the narrower end of the seal 52 faces the trailing end of the wrapper.

The invention in its various forms as described, provides positive assurance to the user that the roll of film will not accidentally unroll before or after exposure, and that a positive force must be exerted to break the seals at the leading and trailing ends of the wrapper.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

An improved photographic film package, comprising an elongated wrapper, said wrapper being made of rollable sheet material, a strip of film on one side of the wrapper, said wrapper having narrow opposite leading and trailing ends for fitting into slots in takeup and supply spools respectively, said film strip having opposite leading and trailing ends spaced from the leading and trailing ends respectively of the wrapper, a first elongated pressure sensitive adhesive seal longitudinally disposed and located near the leading end of the wrapper on said one side thereof, remote from the film strip and remote from the leading end; a second elongated pressure sensitive adhesive seal longitudinally disposed and located on said one side of the wrapper between the first seal and the leading end of the film strip, and a third elongated pressure sensitive adhesive seal longitudinally disposed and located on said one side of the wrapper at the trailing end thereof remote from the film strip and remote from the trailing end, whereby accidental unrolling of the wrapper on the supply spool is prevented by the first and second seals, and accidental unrolling of the wrapper on the takeup spool is prevented by the third seal, each of said seals including a tab secured by a permanent adhesive to the wrapper with pressure sensitive adhesive coats adhering to outer sides of the tabs, each of said tabs being trapezoidal in form, the narrower ends of the first and second seals facing the leading end of the wrapper, the narrower end of the third seal facing the trailing end of the wrapper.

References Cited in the file of this patent

UNITED STATES PATENTS

| | | |
|---|---|---|
| 591,346 | Esmond | Oct. 5, 1897 |
| 709,053 | Shaw | Sept. 16, 1902 |
| 778,403 | Cline | Dec. 27, 1904 |
| 1,500,393 | Jones | July 8, 1924 |

FOREIGN PATENTS

| | | |
|---|---|---|
| 469,653 | Great Britain | July 29, 1937 |
| 696,002 | Great Britain | Aug. 19, 1953 |